(12) United States Patent
Hotta et al.

(10) Patent No.: US 7,159,543 B2
(45) Date of Patent: Jan. 9, 2007

(54) CONTROLLING AN ENGINE WITH A MULTI LINK-TYPE PISTON CRANK MECHANISM

(75) Inventors: Isamu Hotta, Yokohama (JP); Toru Noda, Yokohama (JP); Masaaki Kubo, Yokohama (JP); Katsuya Moteki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/142,892

(22) Filed: Jun. 2, 2005

(65) Prior Publication Data

US 2005/0268870 A1 Dec. 8, 2005

(30) Foreign Application Priority Data

Jun. 4, 2004 (JP) ............................. 2004-166775

(51) Int. Cl.
*F02B 75/04* (2006.01)

(52) U.S. Cl. .................. 123/48 R; 123/48 B; 123/78 F (58) Field of Classification Search ............. 123/48 R, 123/48 B, 78 R, 78 F
See application file for complete search history.

(56) References Cited

U.S. PATENT DOCUMENTS 6,564,769 B1 * 5/2003 Kolmanovsky et al. ..... 123/295
6,792,924 B1 9/2004 Aoyama et al.

FOREIGN PATENT DOCUMENTS

JP 2003-232233 A 8/2003

* cited by examiner

*Primary Examiner*—Noah P. Kamen
(74) *Attorney, Agent, or Firm*—Global IP Counselors (57) ABSTRACT

An engine having a cylinder, a piston slideably received in the cylinder, a crankshaft connected to the piston, and a multi-link piston crank mechanism. The multi-link piston crank mechanism controls movement of the piston such that an acceleration of the piston at top dead center is less than an acceleration of the piston at bottom dead center. A determining device determines an operating condition of the engine. A combustion mode control device controls the engine to operate at an air-fuel ratio leaner than a stoichiometric air-fuel ratio when the determining device determines that the operating condition of the engine is in a predetermined operating region.

18 Claims, 5 Drawing Sheets

CONTROLLING AN ENGINE WITH A MULTI LINK-TYPE PISTON CRANK MECHANISM

CROSS-REFERENCE TO RELATED APPLICATION

The present application claims priority under 35 U.S.C. § 119 of Japanese Patent Application No. 2004-166775, filed on Jun. 4, 2004, the entire content of which is expressly incorporated by reference herein.

BACKGROUND OF THE INVENTION

1. Field of the Invention

The present invention relates to an engine equipped with a multi-link (double-link or other multi-link) type piston crank mechanism, and, more particularly, to an engine with a multi-link type piston crank mechanism constructed in such a way that a piston stays in the vicinity of the top dead center longer than a conventional piston. The present invention can be applied to an engine equipped with a multi-link type piston crank mechanism and is effective in improving the heat efficiency of the engine to reduce fuel consumption.

2. Description of Related Art

Japanese Laid-Open Patent Publication No. 2003-232233 (related to U.S. Pat. No. 6,792,924, which is incorporated by reference in its entirety herein) discloses an engine which has a double-link type piston crank mechanism, and increases a compression ratio of the engine to improve fuel consumption, by raising the top dead center position of a piston in a partial load operation mode using the characteristics of the double-link type piston crank mechanism.

When the compression ratio is increased, the heat efficiency increases while the cooling loss caused by a rise in combustion temperature also increases. Accordingly, the engine disclosed in Japanese Laid-Open Patent Publication No. 2003-232233 drops the combustion temperature by executing sufficient exhaust gas recirculation, thereby suppressing the cooling loss. As the amount of the exhaust gas recirculation increases, the combustion speed gets slower, so that when combustion is carried out with a delay at a timing shifted from the top dead center (e.g., retarded ignition), the combustion becomes unstable. In this respect, the engine in Japanese Laid-Open Patent Publication No. 2003-232233 further uses its double-link type piston crank mechanism to change the piston motion in such a way that the piston stays longer in the vicinity of the top dead center, thereby preventing instability of the combustion.

Therefore, the engine in Japanese Laid-Open Patent Publication No. 2003-232233 can improve the heat efficiency by increasing the compression ratio; can reduce the cooling loss and pumping loss with sufficient exhaust gas recirculation (thus improving the fuel consumption); and can reduce the exhaust amount of nitrogen oxide(s) by decreasing the combustion temperature using exhaust gas recirculation.

However, the use of exhaust gas recirculation is not advantageous in all ways. For example, because exhaust gas recirculation dilutes the air/fuel mixture by recirculating the exhaust gases into the air/fuel charge, the heat efficiency achievable by using exhaust gas recirculation in the double-link crank mechanism is not optimum.

SUMMARY OF THE INVENTION

An engine, and the method of controlling such an engine, according to the present invention ensures a high heat efficiency and low fuel consumption by combination of the multi-link piston crank mechanism and lean combustion.

An engine according to the present invention is provided with a multi-link type piston crank mechanism so configured as to provide a piston motion in which the acceleration of a piston in the vicinity of top dead center is lower than an acceleration of the piston in the vicinity of bottom dead center. An operating condition (a combination of engine load and engine speed) of the engine is determined, and when it is determined that the operating condition of the engine lies in a partial load region (e.g., a predetermined first operating region), the engine is operated at an air-fuel ratio leaner than a stoichiometric air-fuel ratio.

According to one version of the present invention, an engine includes a cylinder, a piston slideably received in the cylinder, a crankshaft connected to the piston, and a multi-link piston crank mechanism connected to the crankshaft for controlling movement of the piston such that an acceleration of the piston at top dead center is less than an acceleration of the piston at bottom dead center. A determining device determines an operating condition of the engine. A combustion mode control device controls the engine to operate at an air-fuel ratio leaner than a stoichiometric air-fuel ratio when the determining device determines that the operating condition of the engine is in a predetermined first operating region. According to this version of the invention, the engine ensures a high heat efficiency and low fuel consumption by making use of the characteristics of a multi-link type piston crank mechanism.

The combustion mode control device may control the engine such that a homogeneous air-fuel mixture is formed and combusted in the cylinder when the combustion mode control device controls the engine to operate at the air-fuel ratio leaner than the stoichiometric air-fuel ratio. Alternatively or in addition, the combustion mode control device controls the engine such that a stratified air-fuel mixture with different air-fuel ratios in different strata is formed and combusted in the cylinder when the combustion mode control device controls the engine to operate at the air-fuel ratio leaner than the stoichiometric air-fuel ratio. Still further alternatively or in addition, the combustion mode control device controls the engine to operate at the stoichiometric air-fuel ratio when the determining device determines that the operating condition of the engine is not in the predetermined first operating region.

The engine may further include a compression ratio change device connected to the multi-link piston crank mechanism for changing a connecting position of the multi-link piston crank mechanism relative to the engine so that a top dead center position of the piston is adjusted to change a compression ratio of the engine. The compression ratio change device raises the top dead center of the piston to increase the compression ratio of the engine when the determining device determines that the operating condition of the engine is in a predetermined second operating region. This compression ratio change device may lower the top dead center position of the piston to decrease the compression ratio of the engine when the determining device determines that the operating condition of the engine is in the predetermined second operating region, in which an engine load is higher than in the predetermined partial load region. The multi-link piston crank mechanism may control the piston such that an acceleration of the piston at top dead center is lowered when the compression ratio change device raises the top dead center.

In one embodiment, the operating condition is determined according to engine load, or according to a combination of engine load and engine speed.

In another version of the invention, an engine control system includes a multi-link piston and cylinder system arranged to eccentrically move a piston within a cylinder such that piston acceleration is slowed at a top dead center position, the top dead center position being adjustable. An engine load sensor measures engine load, an engine speed sensor measures engine speed, a fuel injection system causes an injection of fuel of a variable amount into the cylinder, and an ignition system causes an ignition of fuel in the cylinder. An engine control unit circuit is connected to each of the engine load sensor, the engine speed sensor, fuel injection system, and the ignition system. The engine control unit circuit selects a combustion mode from a plurality of combustion modes including a lean combustion mode and a stoichiometric combustion mode, and the engine control unit circuit is capable of adjusting the top dead center position of the multi-link piston and cylinder system, the variable amount of fuel, timing of the injection of fuel, or timing of the ignition system according to the selection of a combustion mode.

In one embodiment, the engine control unit circuit selects one of the lean combustion mode or the stoichiometric combustion mode depending upon a combination of engine load measured by the engine load sensor and engine speed measured by the engine speed sensor.

The lean combustion mode selected by the engine control unit circuit may be selected from one of a stratified lean combustion mode, in which at least the top dead center position of the multi-link piston and cylinder system, the variable amount of fuel, and timing of the injection of fuel are adjusted to create a stratified lean air-fuel mixture in the cylinder in which different air-fuel ratios occur in different parts of a top of the cylinder; and a homogenous lean combustion mode, in which at least the top dead center position of the multi-link piston and cylinder system, the variable amount of fuel, and timing of the injection of fuel are adjusted to create a homogenous lean air-fuel mixture in the cylinder in which the same air-fuel ratio occurs in substantially all of the top of the cylinder.

In this version of the invention, the top dead center position may be adjustable between a high compression mode top dead center position and a low compression mode top dead center position. The engine control unit circuit may adjust the top dead center position to the high compression mode top dead center position when selecting the stratified lean combustion mode. When the engine control unit circuit selects either one of the homogenous lean combustion mode or the stoichiometric combustion mode, the engine control unit circuit may adjust the top dead center position to one of the low compression mode top dead center position or the high compression mode top dead center position depending upon a combination of engine load measured by the engine load sensor and engine speed measured by the engine speed sensor.

According to another version of the present invention, a method of controlling an engine, includes eccentrically moving a piston within a cylinder such that an acceleration of the piston at a top dead center position is less than an acceleration of the piston at a bottom dead center position, and determining an operating condition of the engine. The method also includes operating the engine at an air-fuel ratio leaner than a stoichiometric air-fuel ratio when the operating condition of the engine is in a predetermined first operating region.

The method may further include, when operating the engine at the air-fuel ratio leaner than the stoichiometric air-fuel ratio, forming a homogeneous air-fuel mixture, and combusting the homogeneous air-fuel mixture in the cylinder. When operating the engine at the air-fuel ratio leaner than the stoichiometric air-fuel ratio, the method may include forming a stratified air-fuel mixture with different air-fuel ratios in different strata, and combusting the stratified air-fuel mixture in the cylinder.

In this version of the invention, the method may include adjusting the top dead center position to increase a compression ratio of the engine when the operating condition of the engine is in a predetermined second operating region, and adjusting the top dead center position to decrease a compression ratio of the engine when the operating condition of the engine is not in the remaining second operating region.

The method may determine the operating condition according to a combination of engine load and engine speed.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The following will explain, with reference to the above-described drawings, preferred embodiments of the present invention, in which like characters represent like elements. The particulars shown herein are by way of illustrative example of the embodiments of the invention only and are presented in the cause of providing what is believed to be the most useful and readily understood description of the principles and conceptual versions of the present invention. In this regard, no attempt is made to show structural details of the invention in more detail than is necessary for the fundamental understanding of the present invention, the description taken with the drawings making apparent to those skilled in the art how the several forms of the present invention may be embodied in practice.

In an engine which executes the exhaust gas recirculation in a partial load operation mode, the specific heat ratio of the exhaust gas to be recirculated is large, so that the heat efficiency in the case of executing the exhaust gas recirculation becomes lower than that in the case of executing lean combustion (e.g., if lean combustion is contemplated as a means of reducing combustion temperatures).

Lean combustion in such a partial load region allows an increase in the heat efficiency and a decrease in the pumping loss, thereby improving fuel consumption. Although lean combustion ensures low fuel consumption, it is difficult to ensure high combustion stability with lean combustion. That is, since the combustion velocity of lean combustion is small, flame propagation in lean combustion is likely to be terminated halfway. Downward movement of the piston after top dead center increases the volume of the combustion chamber and decreases temperature and pressure in the combustion chamber. Decrease of the temperature and pressure causes termination of the flame propagation. The action of the double-link type piston crank mechanism causes the piston to stay longer in the vicinity of top dead center, creating and keeping a high-temperature and high-pressure field in the combustion chamber. Therefore, the multi-link type piston crank mechanism can suppress termination of the flame propagation in lean combustion and can suppress unstable combustion of lean combustion.

Since the specific heat ratio of lean combustion gas is smaller than the specific heat ratio of combustion gas including recirculated exhaust gas, lean combustion is better for improving the heat efficiency. In addition, the pumping loss becomes small as a consequence of the use of lean combustion, as in the case of exhaust gas recirculation. Therefore, lean combustion ensures lower fuel consumption than exhaust gas recirculation.

Figure 1:
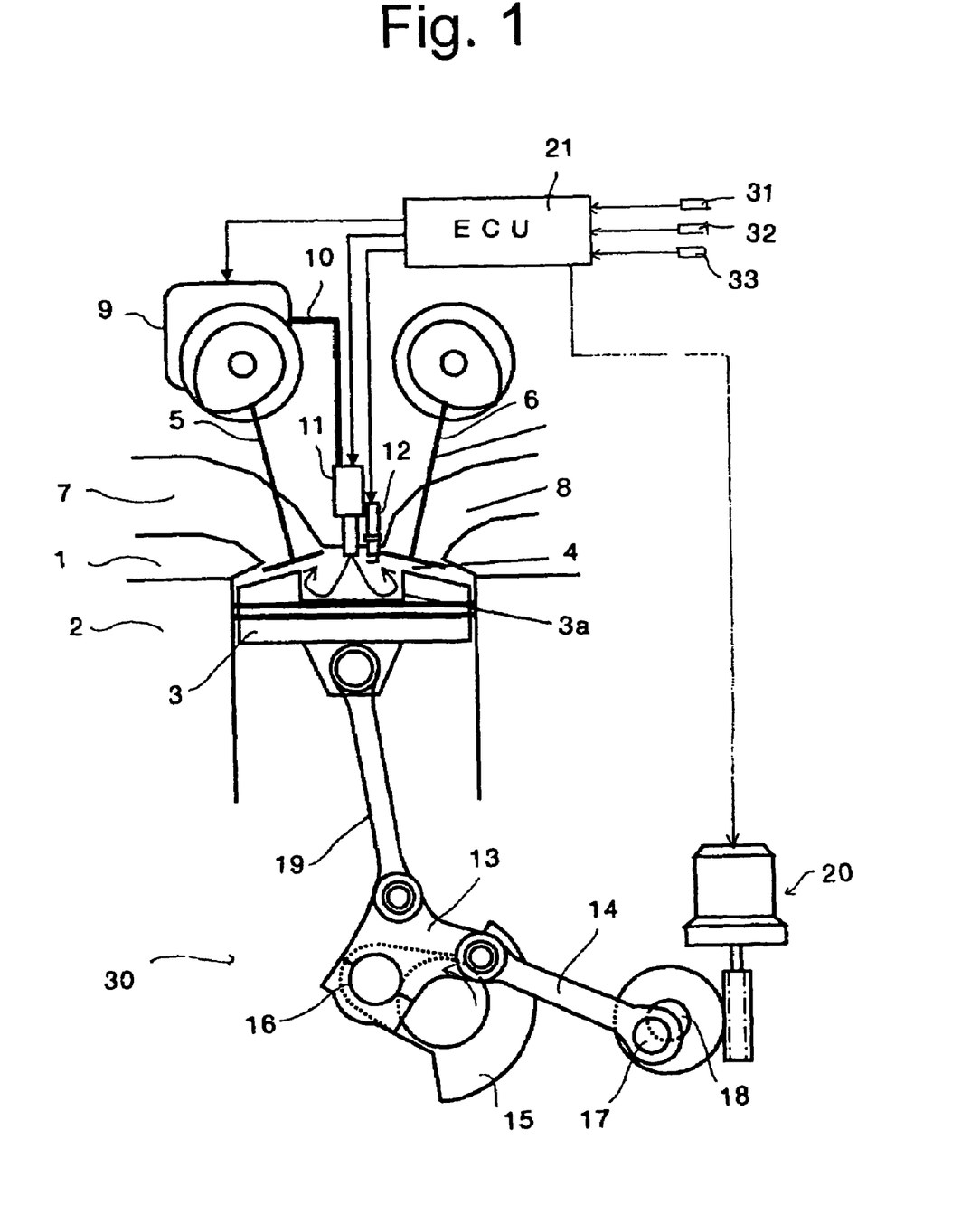
FIG. 1 is a schematic construction view of an engine equipped with a double-link type piston crank mechanism according to the present invention.

An embodiment of the present invention will be described below with reference to the accompanying drawings. FIG. 1 illustrates the schematic construction of a spark ignition engine equipped with a double-link type piston crank mechanism according to the invention. The engine includes a cylinder head 1, a cylinder block 2, and a combustion chamber 4 defined by a piston 3 received in a cylinder formed in the engine. Fresh air is supplied from an intake port 7 through an intake valve 5, and the exhaust gas is discharged from an exhaust port 8 through an exhaust valve 6. A fuel pump 9 is connected to the end of a camshaft, which actuates the intake valve 5, so that fuel compressed by the fuel pump 9 can be injected directly into the combustion chamber 4 from a fuel injection valve 11 via a fuel pipe 10.

A recessed bowl portion 3a is provided at that portion of the crest plane of the piston 3 which faces the fuel injection valve 11. In a stratified combustion mode, the injected fuel forms a stratified air-fuel mixture cloud mostly in the bowl portion 3a and the space above the bowl portion 3a, and combustion is done by igniting the air-fuel mixture cloud with an ignition plug 12.

The engine further includes a double-link type piston crank mechanism 30, which comprises a lower link 13, a control link 14, a crankshaft 15, a crankpin 16, an eccentric portion 17, a control shaft 18, and a connecting rod 19. The rotational position of the control shaft 18 is controlled by a compression ratio control actuator 20, which mainly comprises an electric motor, based on a control signal from an engine control unit ("ECU") 21. When the rotational position of the control shaft 18 changes, the eccentric portion 17 is moved and the rotational center of the control link 14, with respect to the engine body, also changes. As a result, the top dead center of the piston 3 is changed ("raised" or "lowered"), making it possible to change the compression ratio of the engine. That is, the double-link type piston crank mechanism 30 functions as (i.e., is one kind of) variable compression ratio mechanism to change the compression ratio of the engine.

The construction of the double-link type piston crank mechanism 30 shown in FIG. 1 is just an example of the construction to which the invention is applied, and the double-link type piston crank mechanism 30 may take various constructions, including the one disclosed in Unexamined Japanese Patent Publication No. 2003-232233, as long as the mechanism can provide a piston motion where the acceleration of the piston 3 in the vicinity of top dead center is lower than the acceleration of the piston 3 in the vicinity of bottom dead center. However, in addition, the double-link piston crank mechanism 30 can be arranged (using well understood mechanical design principles) to control the piston such that an acceleration of the piston at top dead center is lowered (i.e., further lowered) when the double-link piston crank mechanism 30 raises the top dead center.

The ECU 21 receives signals from a crank angle sensor 31, which detects the rotational angle (relating to the engine speed) of the crankshaft 15, a coolant temperature sensor 32, which detects the temperature of the coolant of the engine, and an acceleration pedal depression sensor 33, which detects the degree to which the acceleration pedal is depressed (relating to engine load). Accordingly, the crank angle sensor 31 is considered a type of engine speed sensor, and the pedal depression sensor 33 is considered a type of engine load sensor, notwithstanding that the mode of sensing may be indirect. Based on the signals, the ECU 21 performs switching between types of the combustion mode and compression ratio mode to be discussed below, in addition to controlling the fuel injection amount, the fuel injection timing and the ignition timing.

Figure 5:
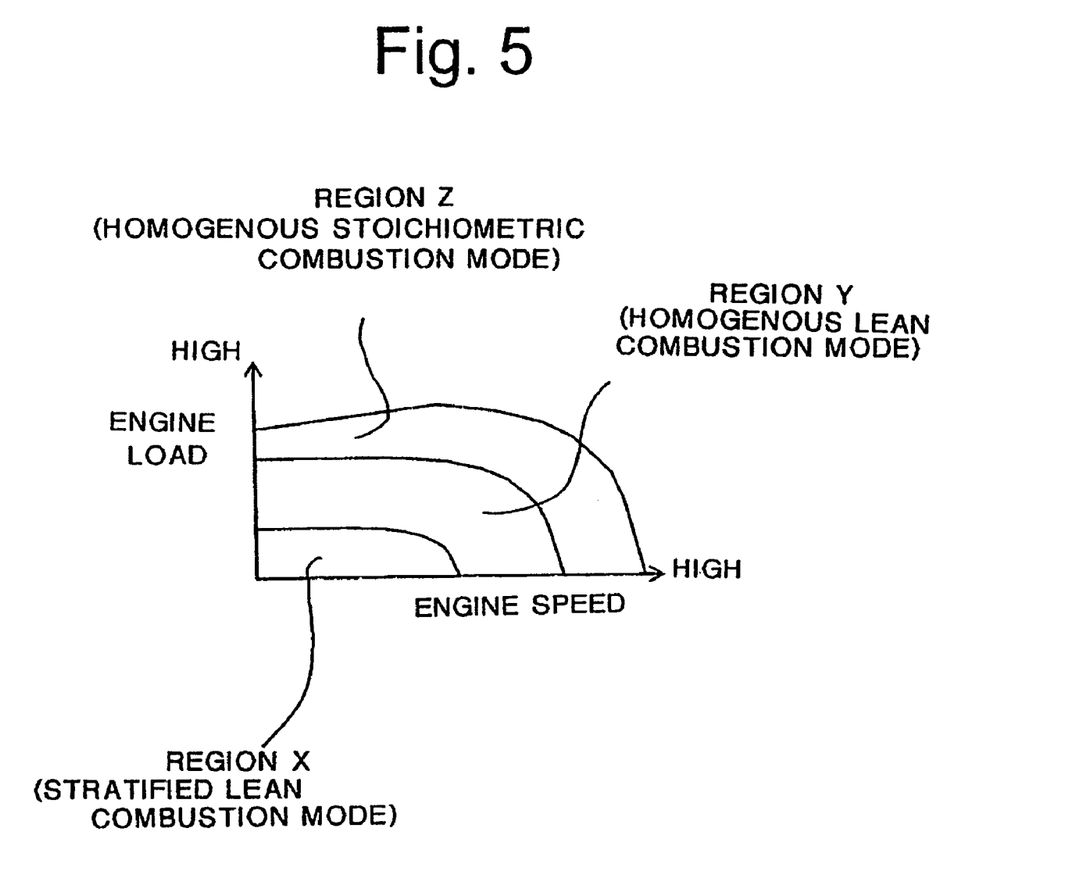
FIG. 5 is an exemplary map for determining the combustion mode of the engine.

The engine is provided with, different combustion modes. Among the combustion modes are a stratified combustion mode where fuel injection is executed during a compression stroke (particularly, the second half of the compression stroke) to realize a lean combustion operation, thereby reducing the fuel consumption; a homogeneous lean combustion mode where fuel injection is executed during an intake stroke to realize a lean combustion operation, also reducing the fuel consumption; and a homogeneous stoichiometric combustion mode where fuel injection is executed during an intake stroke to realize a stoichiometric combustion operation. One of those modes is appropriately selected according to the operating condition of the engine that is determined based on the engine speed and the engine load, as shown in FIG. 5. The modes are carried out by advancing or retarding the times of fuel injection and ignition, as discussed below.

In the stratified combustion mode, a lean air-fuel mixture is formed in the bowl portion 3a and the space above the bowl portion 3a that has an air-fuel ratio leaner than a stoichiometric air-fuel ratio. An air layer lies at the circumference of the lean air fuel mixture. This mixture is ignited with the ignition plug 12 to carry out combustion. In a homogeneous lean combustion mode, a lean air-fuel mixture with an air-fuel ratio leaner than a stoichiometric air-fuel ratio is formed in the entire combustion chamber 4, and is ignited with the ignition plug 12 to carry out combustion. From the viewpoint of the entire combustion chamber, the air-fuel ratio in a stratified combustion mode is leaner than the air-fuel ratio in a homogeneous lean combustion mode.

In general, when an air-fuel mixture is ignited at an air-fuel ratio leaner than the stoichiometric air-fuel ratio, downward movement of the piston increases the volume of the combustion chamber 4 so that flame propagation is likely to be exterminated halfway, making it difficult to propagate the flame into the entire combustion chamber 4. However, in an engine according to the invention, the action of the double-link type piston crank mechanism 30 causes the piston 3 to stay longer in the vicinity of the top dead center (in comparison to, e.g., an engine equipped with an ordinary single-link type piston crank mechanism), so that a high-temperature and high-pressure field is produced in the combustion chamber 4, and termination of flame propagation which is caused by the downward movement of the piston 3 is avoided, in either one of the lean combustion modes, namely the stratified lean combustion mode and the homogeneous lean combustion mode. The engine can therefore propagate flame into the entire combustion chamber 4 even at an air-fuel ratio leaner than a stoichiometric air-fuel ratio, thereby ensuring stable combustion.

Figure 4:
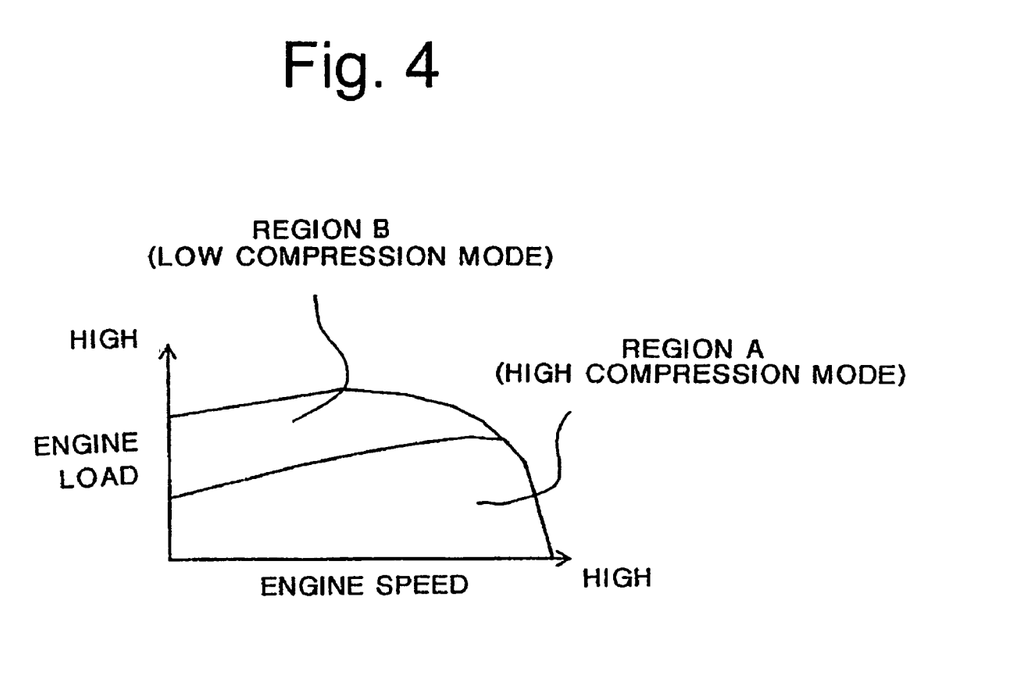
FIG. 4 is an exemplary map for determining the compression ratio mode of the engine.

As shown in FIG. 4, the engine is provided with a high compression ratio mode to set the compression ratio of the engine to be high in an operating region on the relatively low load side and a low compression ratio mode to set the compression ratio of the engine to be low in an operating region on the relatively high load side. Either one of the compression ratio modes is selected according to the operating condition of the engine, that is, when the engine load is sufficiently high (depending on the rotation speed), the invention contemplates operating the engine at a lower compression ratio. The result is that heat efficiency is improved in the low-load side operating region by increasing the compression ratio of the engine, but occurrence of engine knocking is effectively suppressed in the high-load side operating region by lowering the compression ratio of the engine.

It should be noted that FIG. 4 is exemplary. It will be evident to those of ordinary skill in the art that the thresholds at which an engine should switch to or from a low compression mode (that suppresses knocking) to a high compression mode (that improves heat efficiency at low loads) are dependent upon many factors, including the geometry of the engine, and will be different for each engine configuration and different for the goals of the engine design (e.g., depending on a balance of desired performance, efficiency, emissions, knock reduction and/or other goals). Accordingly, appropriate data for generating a map such as FIG. 4 can be empirically determined or modeled, but the generation of a map such as FIG. 4 for a particular engine configuration is a task that can be carried out by the exercise of ordinary skill. The invention does not depend upon any particular factors considered by a designer in selecting the location of the line separating Mode A from Mode B. Nonetheless, according to the invention, the "switching" thresholds (e.g., the line separating Mode A from Mode B) are selected to result in suppression of knocking in the low compression mode and improved heat efficiency for low loads at the high compression mode.

Figure 2:
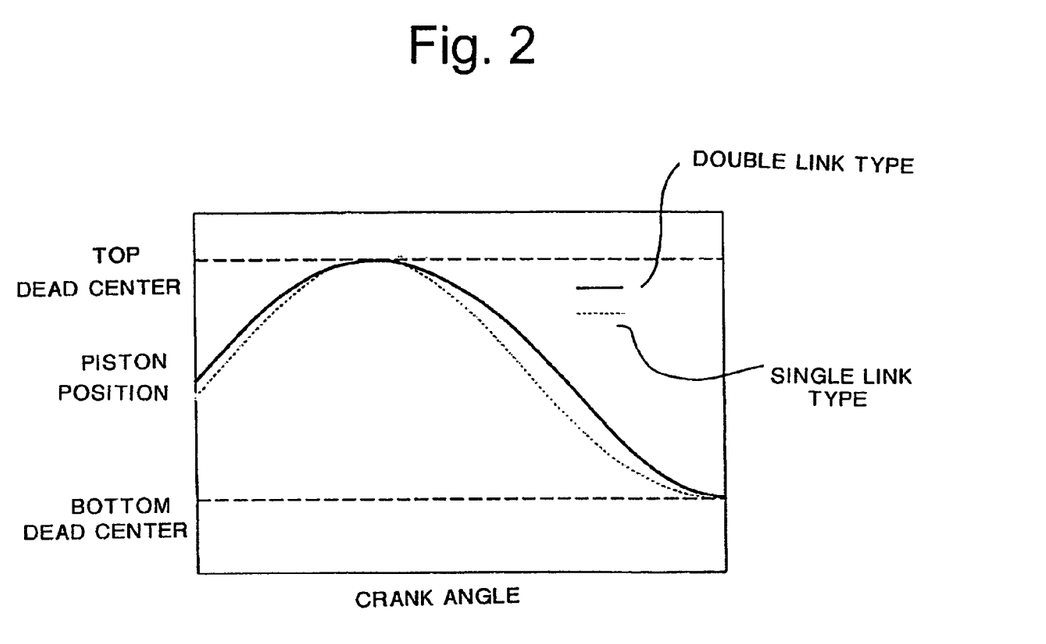
FIG. 2 is a diagram showing the piston motion of an engine having a double-link type piston crank mechanism in comparison with the piston motion of an engine having a single-link type piston crank mechanism.

FIG. 2 shows the piston motion state of an engine having a double-link type piston crank mechanism in comparison with the piston motion state of an engine having a single-link type piston crank mechanism. The height from the crankshaft to the top surface of the piston is the same in both engines.

As would be readily understood by one of ordinary skill in the art, the slope of the lines in FIG. 2 would represent velocity, with the rate of change of the slope of the lines in FIG. 2 representing acceleration. As shown in FIG. 2, in an engine with the double-link type piston crank mechanism, the action of the double-link type piston crank mechanism reduces the maximum acceleration of the piston in the vicinity of top dead center, and thus reduces the amount of displacement of the piston in the vicinity of the top dead center. Consequently, the piston can approach top dead center at an earlier timing, and can stay longer in the vicinity the top dead center than is allowed by the single-link type piston crank mechanism. As a result, the double-link type piston crank mechanism can make a high-temperature and high-pressure state in the vicinity of the top dead center persist for a relatively longer time, so that combustion stability, particularly in the low-load side operating region, can be improved.

Figure 3:
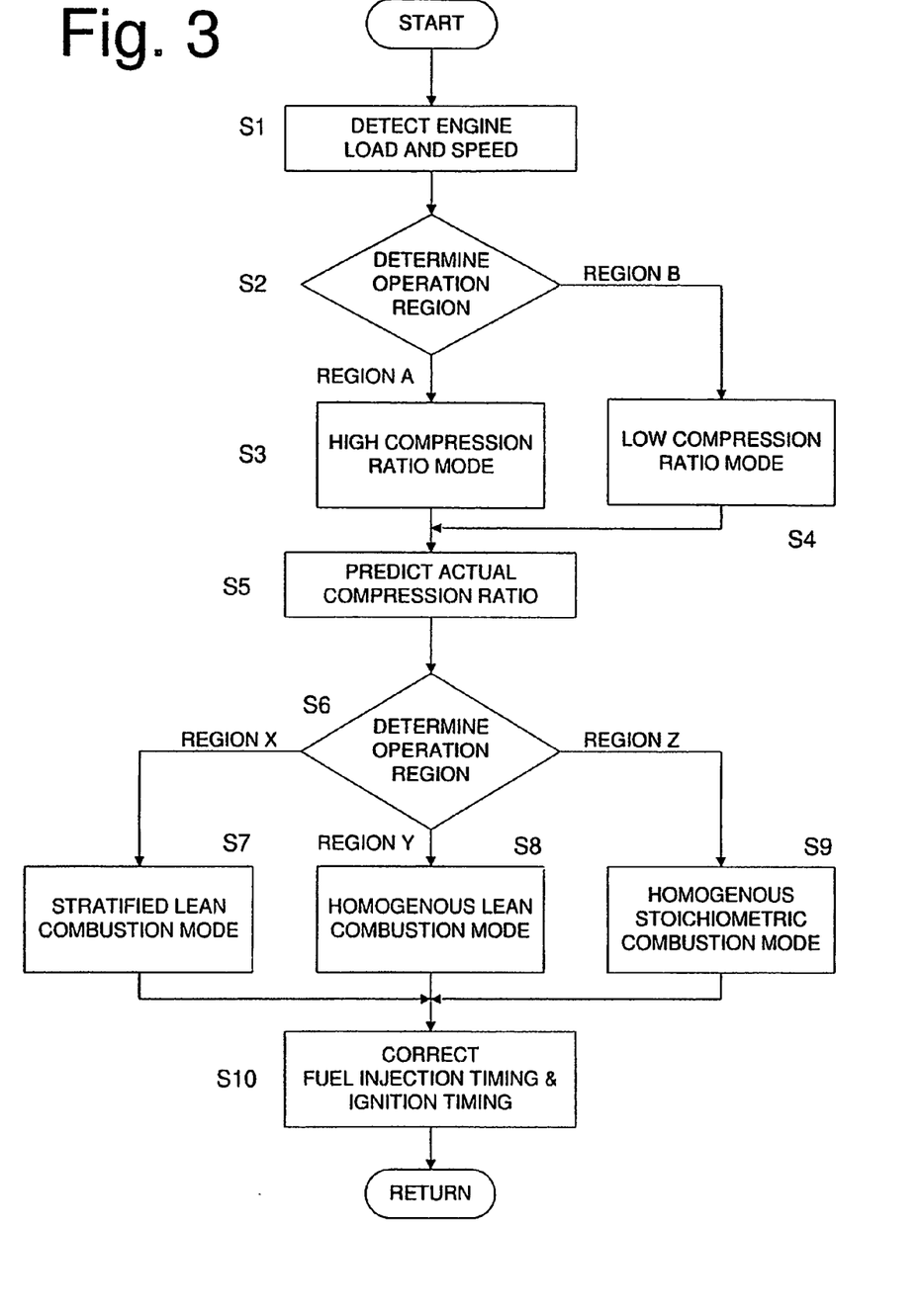
FIG. 3 is a flowchart illustrating the contents of controls of an engine control unit.

FIG. 3 is a flowchart illustrating the contents of a compression ratio mode switching control and a combustion mode switch control according to the invention. The flowchart is repeatedly executed by the Engine Control Unit ("ECU") 21 at predetermined time intervals (e.g., every 10 msec, although "predetermined" time interval does not preclude a time interval that varies in a predetermined manner).

First, at step S1, the engine speed and the engine load are detected based on the signals from the crank angle sensor 31 (one type of engine speed sensor) and the acceleration pedal depression sensor 33 (one type of engine load sensor). Although the engine load is detected from the depression amount of the acceleration pedal in this embodiment, the engine load may be detected from the amount of fuel injection, the target torque of the engine, or the like. Similarly, engine speed can be detected in other fashions other than based on the crank angle sensor.

At next step S2, by referring to a compression ratio mode map such as that shown in FIG. 4, it is determined whether the operating condition of the engine, meaning a combination of the engine speed and the engine load is in a region "A", which is set on the low-load side of the entire operating region, or a region "B" which is set on the higher-load side to the region "A", and the flow of control proceeds to step S3 or step S4 according to the region where the operating condition lies. The boundary between "A" and "B" is empirically acquired. The data defining the boundary are stored in ROM (Read Only Memory) in the ECU 21. The boundary is a set of operating conditions where engine knocking can be barely restrained at the high compression ratio when the combustion mode is appropriately selected. The operating region to be able to suppress the knocking is set to the region "A".

In other words, region "A" of FIG. 4 includes the set of combinations of engine load and engine speed (operating conditions) that restrain knocking during high compression ratio operation, the border between "A" and "B" is set to continue to restrain knocking while the engine is switched to low compression ratio operation, and region "B" includes the set of operating conditions that restrain knocking during low compression mode operation.

If the operating condition lies in the region "A", flow proceeds to step S3. At step S3, a target compression ratio of the engine is set to a predetermined high compression ratio, and the actuator 20 is controlled in such a way as to achieve the set target compression ratio (i.e., setting a higher top dead center height). If the operating condition lies in the region "B", flow proceeds to step S4 instead of step S3. At step S4, a target compression ratio of the engine is set to a predetermined low compression ratio lower than the compression ratio set at step S3, and the actuator 20 is controlled in such a way as to achieve the set target compression ratio (i.e., setting a lower top dead center height).

At step S5, an actual compression ratio in the next cycle is predicted. Prediction is employed to account for time lag as the actuator 20 operates. In other words, even when the target compression ratio is set and the control of the actuator 20 is initiated at step S3 or S4, there is a certain time lag for the actual compression ratio to reach the target compression ratio. This time lag is substantial because of the relatively slow response speed of the actuator 20, and generally cannot be neglected, in contrast to, for example, the faster response speed of changing the fuel injection amount, changing the fuel injection timing or changing the ignition timing. The prediction is based on the response speed of the actuator 20. In detail, the actual compression ratio is predicted by performing a delay process which correlates the response characteristic of the actuator 20, the current compression ratio (i.e., the actual compression ratio predicted in the previous cycle), and the target compression ratio set at step S3 or S4.

The invention does not depend upon the particular prediction, and the appropriate time lag and appropriate prediction is readily determined for a particular engine configuration, for example, by modeling or empirically (e.g., by modeling or measuring the compression ratio in a test engine as the actuator is controlled).

At step S6, referring to a combustion mode map such as the one depicted in FIG. 5, it is determined whether the operating condition of the engine (again, a combination of engine load and engine speed) lies in a particular combustion mode region. It should be noted that FIG. 5 is again, merely exemplary. The data of the boundaries which form the combustion mode map are stored in the ROM.

At step S6, referring to a combustion mode map such as the one shown in FIG. 5, it is determined whether the operating condition of the engine lies in a region "X" which is set when the engine operates at a low speed and under a low load, a region "Y" which is set when the engine operates at a higher speed and under a higher load than region "X", or a region "Z" which is set when the engine operates at a yet higher speed and under a yet higher load than region "Y". The flow then proceeds to one of steps S7, S8 and S9 according to the operating condition (combination of engine load and engine speed).

When the operating condition lies in the region "X", the flow proceeds to step S7. At step S7, the combustion mode of the engine is set to the stratified lean combustion mode, and the fuel injection timing and the ignition timing are calculated based on the operating condition be referring to predetermined maps prepared beforehand for the stratified lean combustion mode. The fuel injection timing map and the ignition timing map are stored in the ROM, and are acquired by experiment in consideration of the compression ratio of the engine being changed according to the map shown in FIG. 4. routine and generally require only ordinary skill. In this particular embodiment, the region "X" is wholly contained within the region "A", although the invention does not require such. When the region "X" is included in the region "A", the maps are set (acquired by experiment) such that the fuel injection timing and the ignition timing are suitable for executing stratified lean combustion at the high compression ratio of region "A" (according to well understood principles of advancing or retarding injection and/or ignition, e.g., to achieve efficient combustion).

When the operating condition lies in the region "Y", the flow proceeds to step S8. At step S8, the combustion mode of the engine is set to the homogeneous lean combustion mode, and the fuel injection timing and the ignition timing are calculated based on the operating condition by referring to predetermined maps prepared beforehand for the homogeneous lean combustion mode. In this particular embodiment, the combustion mode region "Y" overlaps both the compression mode region "A" and the compression mode region "B", although the invention does not require such.

The individual maps for fuel injection timing and ignition timing are set (acquired by experiment) in such a way that the timing of each is suitable for executing homogeneous lean combustion at a high compression ratio for combinations of engine speed and engine load where the combustion mode region "Y" and the compression mode region "A" overlap each other. Similarly, the maps are set such that the fuel injection timing and the ignition timing are suitable for executing homogeneous lean combustion at a low compression ratio for combinations of engine speed and engine load where the combustion mode region "Y" and the compression mode region "B" overlap each other. Again, such settings or experiments would result in different predetermined maps for each engine configuration, but generally require only ordinary skill. In each of the stratified lean combustion, homogenous lean combustion, and homogenous stoichiometric combustion modes, the amount of fuel injected is also predetermined, and the amount for one mode need not be the same as any other mode.

When the operating condition lies in the region "Z", the flow proceeds to step S9. At step S9, the combustion mode of the engine is set to the homogeneous stoichiometric combustion mode, and the fuel injection timing and the ignition timing are calculated based on the operating condition by referring to predetermined maps prepared beforehand for the homogeneous stoichiometric combustion mode. The individual tables are, as described above with respect to the homogenous lean combustion mode, set by (routine) experiment in consideration of the compression ratio of the engine being changed according to the map shown in FIG. 4 (i.e., in this particular embodiment, taking into account that the combustion mode region "Z" overlaps both the compression mode region "A" and the compression mode region "B", although the invention does not require such).

Following each of step S7, S8, or S9, the flow proceeds to step S11. It should be recalled that in step S5, the actual compression ratio was predicted based on the response characteristics of the actuator 20, the "current" compression ratio, and the target compression ratio. At step S10, the fuel injection timing and the ignition timing (set at step S7, S8 or S9) are corrected based on the difference between the "current" compression ratio and the target compression ratio. The correction is performed considering that the fuel injection timing and the ignition timing set in step S7, S8 or S9 took values based on the assumption that the actual compression ratio had already become the target compression ratio. However, as previously noted, the actual compression ratio changes with a delay with respect to the target compression ratio, due to the operation delay or response delay of the actuator 20.

The invention does not depend upon the particular correction applied, and the appropriate correction to fuel injection timing and/or ignition timing is readily determined for a particular engine configuration, for example, by modeling, or empirically (e.g., by modeling or measuring desired combustion characteristics such as emissions or crankshaft power in a test engine as the actuator 20 is controlled).

Through the above-described processes, the compression ratio mode and the combustion mode of the engine are switched from one to the other according to the operating condition of the engine (combination of engine load and engine speed).

The operation of this embodiment of the invention is described below. The engine is provided with a double-link type piston crank mechanism 30, as seen in FIG. 1, so constructed as to provide piston motion wherein the acceleration of the piston in the vicinity of top dead center is lower than the acceleration of the piston in the vicinity of bottom dead center. An operating condition of the engine is determined (step S2, preferably directly or indirectly measured, but possibly predicted, modeled, or inferred), and the engine is operated at an air-fuel ratio leaner than a stoichiometric air-fuel ratio (lean combustion) when it is determined that the operating condition of the engine lies in a first predetermined operating region (step S7 or S8), thus making it possible to enhance the heat efficiency and improve the fuel consumption, compared with earlier technology which performs exhaust gas recirculation in a partial load region. A "partial load region" is a set of combinations of engine speed and engine load ("region") in which the engine load is not at a maximum ("partial load"). An "operating region" can include one or more partial load regions.

The action of the multi-link (double-link) type piston crank mechanism 30 causes the piston 3 to stay longer in the vicinity of the top dead center, so that a high-temperature and high-pressure field can be produced and maintained in the combustion chamber 4, and termination of flame propagation caused by the downward movement of the piston 3 can be suppressed. Accordingly, combustion stability can be maintained even when lean combustion is carried out in a relatively wide operating region.

As noted above, to one of ordinary skill in the art, the thresholds at which an engine should switch to or from a stratified lean combustion mode (that enhances heat efficiency with the very best fuel consumption) to homogenous lean combustion mode (that enhances heat efficiency with improved fuel consumption) to stoichiometric combustion mode (that is used at times when a lean mixture is disadvantageous, such as during the very highest power and speed demands) are again dependent upon many factors, including the geometry of the engine and the different goals of the engine design (e.g., the balance of desired performance, efficiency, emissions, knock reduction, and/or other goals). Accordingly, appropriate data for generating a map such as FIG. 5 can be empirically determined or modeled, but the generation of a map such as FIG. 5 for a particular engine configuration is a task that can be carried out by the exercise of ordinary skill. The invention does not depend upon any particular factors considered by a designer in selecting the location of the line separating Mode X from Mode Y from Mode Z. In the present embodiment, the "switching" thresholds (e.g., the lines separating Mode X from Mode Y from Mode Z) are selected to result in enhanced heat efficiency and the lowest fuel consumption in the stratified lean combustion mode, in enhanced heat efficiency and improved fuel consumption in the homogenous lean combustion mode, and in the very highest power generation in the stoichiometric combustion mode.

Accordingly, in the lean regions, stratified combustion or homogeneous combustion can be set as the lean combustion system, and may be switched according to the operating condition of the engine in such a way that stratified combustion is done in an operating region which is set to a relatively low-load side and a lower-speed side (i.e., the region "X" in FIG. 5), and homogeneous combustion is done in an operating region which is set to a higher load side and a higher speed side than the region "X" (i.e., the region Y in FIG. 5). When the operating condition of the engine lies in an operating region which is set outside a predetermined operating region (i.e., the region "Z" in FIG. 5, which is outside the lean combustion regions "X" and "Y"), the combustion system of the engine is switched to the homogeneous stoichiometric combustion (step S9) to be able to carry out high-power operation.

Further, when the operating condition of the engine lies in another predetermined region (the lower-load region "A" in FIG. 4), the coupled position of the double-link type piston crank mechanism 30 and the engine body (i.e., the position of the eccentric portion 17) is changed by the actuator 20 (i.e., the compression ratio change mechanism) to raise the top dead center of the piston 3, thereby increasing the compression ratio of the engine (step S3). This can further improve the heat efficiency and make the fuel consumption lower. When it is determined that the operating condition of the engine lies that is not in the other predetermined region, e.g., on a higher load side region "B" that is not in the predetermined lower-load operating region "A", the top dead center of the piston 3 is lowered to reduce the compression ratio of the engine (step S4), making it possible to effectively suppress knocking.

In other words, an engine control system such as that depicted in FIG. 1 includes a multi-link (e.g., double-link) piston and cylinder system (30) arranged to eccentrically move a piston 3 within a cylinder such that piston acceleration is slowed at a top dead center position. The top dead center position is adjustable via the actuator 20. An engine load sensor 33 measures engine load, an engine speed sensor 31 measures engine speed, a fuel injection system (including valve 11) causes an injection of fuel of a variable amount into the cylinder, and an ignition system (including plug 12) causes an ignition of fuel in the cylinder. An engine control unit circuit (including ECU 21 and associated control lines) is connected to each of the engine load sensor 33, the engine speed sensor 31, fuel injection system (including valve 11), and the ignition system (including plug 12). The engine control unit circuit selects a combustion mode from combustion modes including two lean combustion modes and a stoichiometric combustion mode. The engine control unit circuit is capable of adjusting the top dead center position of the double-link piston and cylinder system, the variable amount of fuel, timing of the injection of fuel, or timing of the ignition system according to the selection of the combustion mode.

The engine control unit circuit selects one of the lean combustion mode or the stoichiometric combustion mode depending upon a combination of engine load measured by the engine load sensor and engine speed measured by the engine speed sensor. The lean combustion mode selected by the engine control unit circuit may be selected from one of a stratified lean combustion mode, in which at least the top dead center position of the double-link piston and cylinder system, the variable amount of fuel, and timing of the injection of fuel are adjusted to create a stratified lean air-fuel mixture in the cylinder in which different air-fuel ratios occur at the top of the cylinder; and a homogenous lean combustion mode, in which these are again adjusted to create a homogenous lean air-fuel mixture with same air-fuel ratio in substantially all of the top of the cylinder.

In the present embodiment, the higher the top dead center is raised by the double-link type piston crank mechanism 30 with the construction shown in FIG. 1, the lower the maximum acceleration of the piston in the vicinity of the top dead center becomes, i.e., the longer the piston 3 stays in the vicinity of the top dead center. Accordingly, combustion stability during lean combustion can be secured in the high compression ratio mode and the cooling loss is reduced in a low compression ratio mode, making it possible to further improve the heat efficiency.

The operating region where lean combustion is possible becomes wider so that even when lean combustion is executed, the amount of nitrogen oxide which is produced during combustion can be suppressed to a sufficiently low level, and using a highly ignitable fuel can further widen the operation region where lean combustion is possible.

As discussed herein and in the claims, "a cylinder" means one or more cylinders; "a double-link piston crank mechanism" or "a multi-link piston crank mechanism" means one or more of these, and so on, as appropriate, and unless otherwise specified. "Determining" includes measuring, modeling, predicting, or other means of substantially accurately obtaining a desired value.

It is not necessary to completely eliminate exhaust gas recirculation to take advantage of lean combustion modes in the manner described herein. Exhaust gas recirculation could be combined with the systems of the present invention in a manner well understood by those of skill in the art, and such an arrangement would fall within the bounds of the contemplated invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. An engine comprising:
   a cylinder;
   a piston slideably received in the cylinder;
   a crankshaft connected to the piston;
   a multi-link piston crank mechanism connected to the crankshaft for controlling movement of the piston such that an acceleration of the piston at top dead center is less than an acceleration of the piston at bottom dead center;
   a determining device that determines an operating condition of the engine;
   a combustion mode control device that controls the engine to operate at an air-fuel ratio leaner than a stoichiometric air-fuel ratio when the determining device determines that the operating condition of the engine is in a predetermined first operating region;
   a compression ratio change device connected to the multi-link piston crank mechanism configured and arranged to change a compression ratio of the engine between a low compression mode and a high compression mode based on an engine speed and an engine load such that as the engine speed becomes lower, a lower limit of the engine load for the low compression mode is lowered.

2. The engine according to claim 1, wherein
the combustion mode control device controls the engine such that a homogeneous air-fuel mixture is formed and combusted in the cylinder when the combustion mode control device controls the engine to operate at the air-fuel ratio leaner than the stoichiometric air-fuel ratio.

3. The engine according to claim 1, wherein
the combustion mode control device controls the engine such that a stratified air-fuel mixture with different air-fuel ratios in different strata is formed and combusted in the cylinder when the combustion mode control device controls the engine to operate at the air-fuel ratio leaner than the stoichiometric air-fuel ratio.

4. The engine according to claim 1, wherein
the combustion mode control device controls the engine to operate at the stoichiometric air-fuel ratio when the determining device determines that the operating condition of the engine is not in the predetermined first operating region.

5. The engine according to claim 1, wherein
the compression ratio change device is configured and arranged to change a connecting position of the multi-link piston crank mechanism relative to the engine so that a top dead center position of the piston is adjusted to change a compression ratio of the engine, the compression ratio change device raising the top dead center of the piston to increase the compression ratio of the engine when the determining device determines that the operating condition of the engine is in the high compression region.

6. The engine according to claim 5, wherein
the compression ratio change device lowers the top dead center position of the piston to decrease the compression ratio of the engine when the determining device determines that the operating condition of the engine is in the low compression region, in which the engine load is higher than in the high compression region.

7. The engine according to claim 5, wherein
the multi-link piston crank mechanism controls the piston such that an acceleration of the piston at top dead center is lowered when the compression ratio change device raises the top dead center.

8. The engine according to claim 1, wherein
the operating condition is determined according to the engine load.

9. The engine according to claim 8, wherein
the operating condition is determined according to a combination of the engine load and the engine speed.

10. An engine control system comprising:
    a multi-link piston and cylinder system arranged to eccentrically move a piston within a cylinder such that piston acceleration is slowed at a top dead center position, the top dead center position being adjustable;
    an engine load sensor that measures engine load;
    an engine speed sensor that measures engine speed;
    a fuel injection system that causes an injection of fuel of a variable amount into the cylinder;
    an ignition system that causes an ignition of fuel in the cylinder;
    an engine control unit circuit connected to each of the engine load sensor, the engine speed sensor, fuel injection system, and the ignition system, the engine control unit circuit selecting a combustion mode from a plurality of combustion modes including a lean combustion mode and a stoichiometric combustion mode, and the engine control unit circuit being capable of adjusting the top dead center position of the multi-link piston and cylinder system, the variable amount of fuel, timing of the injection of fuel, or timing of the ignition system according to the selection of a combustion mode, the engine control unit circuit being configured and arranged to adjust the top dead center position of the multi-link piston between a top dead center position for a high compression mode and a top dead center position for a low compression mode based on a combination of an engine load measured by the engine load sensor and an engine speed measured by the engine speed sensor such that as the engine speed becomes lower, a lower limit of the engine load for the low compression mode is lowered.

11. The engine control system according to claim 10, wherein
the engine control unit circuit selects one of the lean combustion mode and the stoichiometric combustion mode depending upon a combination of the engine load measured by the engine load sensor and the engine speed measured by the engine speed sensor.

12. The engine control system according to claim 10, wherein
the lean combustion mode selected by the engine control unit circuit is selected from one of:
a stratified lean combustion mode, in which at least the top dead center position of the multi-link piston and cylinder system, the variable amount of fuel, and timing of the injection of fuel are adjusted to create a stratified lean air-fuel mixture in the cylinder in which different air-fuel ratios occur in different parts of a top of the cylinder; and
a homogenous lean combustion mode, in which at least the top dead center position of the multi-link piston and cylinder system, the variable amount of fuel, and timing of the injection of fuel are adjusted to create a homogenous lean air-fuel mixture in the cylinder in which the same air-fuel ratio occurs in substantially all of the top of the cylinder.

13. The engine control system according to claim 10, wherein
the engine control unit circuit adjusts the top dead center position to the top dead center portion for the high compression mode when selecting the stratified lean combustion mode.

14. A method of controlling an engine comprising:
eccentrically moving a piston within a cylinder such that an acceleration of the piston at a top dead center position is less than an acceleration of the piston at a bottom dead center position;
determining an operating condition of the engine;
operating the engine at an air-fuel ratio leaner than a stoichiometric air-fuel ratio when the operating condition of the engine is in a predetermined first operating region; and
changing a compression ratio of the engine between a low compression mode and a high compression mode based on an engine speed and an engine load such that as the engine speed becomes lower, a lower limit of the engine load for the low compression mode is lowered.

15. The method according to claim 14, further comprising, when operating the engine at the air-fuel ratio leaner than the stoichiometric air-fuel ratio:
forming a homogeneous air-fuel mixture; and
combusting the homogeneous air-fuel mixture in the cylinder.

16. The method according to claim 14, further comprising, when operating the engine at the air-fuel ratio leaner than the stoichiometric air-fuel ratio:
forming a stratified air-fuel mixture with different air-fuel ratios-indifferent strata; and
combusting the stratified air-fuel mixture in the cylinder.

17. The method according to claim 14, further comprising the changing of the compression ratio of the engine includes
adjusting the top dead center position to increase the compression ratio of the engine when the operating condition of the engine is in the high compression region; and
adjusting the top dead center position to decrease the compression ratio of the engine when the operating condition of the engine is in the low compression region, in which the engine load is higher than in the high compression region.

18. The method according to claim 14, further comprising determining the operating condition according to the combination of the engine load and the engine speed.

* * * * *